(12) United States Patent
Toews et al.

(10) Patent No.: US 11,460,008 B2
(45) Date of Patent: Oct. 4, 2022

(54) METHOD FOR ON DEMAND POWER PRODUCTION UTILIZING GEOLOGIC THERMAL RECOVERY

(71) Applicant: EAVOR TECHNOLOGIES INC., Calgary (CA)

(72) Inventors: Matthew Toews, Calgary (CA); Bailey Schwarz, Calgary (CA); John Redfern, Calgary (CA); Paul Cairns, Calgary (CA)

(73) Assignee: Eavor Technologies Inc., Calgary (CA)

( * ) Notice: Subject to any disclaimer, the term of this patent is extended or adjusted under 35 U.S.C. 154(b) by 0 days.

(21) Appl. No.: 17/105,568

(22) Filed: Nov. 26, 2020

(65) Prior Publication Data

US 2021/0231109 A1 Jul. 29, 2021

Related U.S. Application Data

(60) Provisional application No. 62/965,833, filed on Jan. 25, 2020.

(51) Int. Cl.
*F03G 7/04* (2006.01)
*F24T 10/10* (2018.01)

(52) U.S. Cl.
CPC ............... *F03G 7/04* (2013.01); *F24T 10/10* (2018.05); *Y02E 10/10* (2013.01); *Y02E 70/30* (2013.01)

(58) Field of Classification Search
CPC .......... Y02E 10/10; F24T 10/20; F24T 10/10; F24T 2010/56; F03G 7/04; H02J 3/28
USPC ......... 60/641.2, 641.3; 165/10, 45, 244, 247
See application file for complete search history.

(56) References Cited

U.S. PATENT DOCUMENTS

| | | | |
|---|---|---|---|
| 5,685,362 A * | 11/1997 | Brown | F24T 10/20 165/45 |
| 8,281,591 B2 | 10/2012 | Lakic | |
| 8,768,795 B2 | 7/2014 | Garrity | |
| 9,002,761 B2 | 4/2015 | Montalvo | |

(Continued)

FOREIGN PATENT DOCUMENTS

| | | |
|---|---|---|
| CA | 2998782 | 10/2018 |
| CA | 3041002 | 5/2019 |

(Continued)

OTHER PUBLICATIONS

JP-2017025730, Feb. 2017, english language machine translation.*

(Continued)

*Primary Examiner* — Devon C Kramer
*Assistant Examiner* — Wesley G Harris
(74) *Attorney, Agent, or Firm* — Fish & Richardson P.C.

(57) ABSTRACT

Methods for providing on demand power to an end user in a variety of embodiments are disclosed. Closed loop thermal recovery arrangements are disposed within a geologic formation having a predetermined potential thermal output capacity. A power generation device is incorporated in the loop to recover energy. A working fluid is circulated within the loop at varying flow rates to oscillate thermal output about the predetermined potential thermal output capacity, to produce on demand power where the average thermal output may equal the predetermined potential thermal output capacity. Integrations with intermittent renewable energy sources are provided which optimize performance and distribution.

41 Claims, 12 Drawing Sheets

(56) References Cited

U.S. PATENT DOCUMENTS

| | | | |
|---|---|---|---|
| 9,312,698 | B2 | 4/2016 | Subbotin |
| 9,395,707 | B2 | 7/2016 | Anderson |
| 9,489,701 | B2 | 11/2016 | Emadi |
| 9,559,520 | B2 | 1/2017 | Shelton |
| 9,690,275 | B2 | 6/2017 | Gan |
| 9,870,593 | B2 | 1/2018 | Sedighy |
| 10,291,025 | B2 | 5/2019 | Baone |
| 10,527,026 | B2 | 1/2020 | Muir |
| 2007/0245729 | A1 | 10/2007 | Mickleson |
| 2008/0195561 | A1 | 8/2008 | Herzig |
| 2009/0066287 | A1 | 3/2009 | Pollack |
| 2010/0071366 | A1* | 3/2010 | Klemencic ............... F03G 7/04 60/641.2 |
| 2011/0048005 | A1 | 3/2011 | McHargue |
| 2012/0174581 | A1 | 7/2012 | Vaughan |
| 2014/0130498 | A1* | 5/2014 | Randolph ............... E21B 43/24 60/645 |
| 2014/0172182 | A1 | 6/2014 | Subbotin |
| 2015/0149249 | A1 | 5/2015 | Mansfield |
| 2015/0153756 | A1 | 6/2015 | Marcus |
| 2016/0211664 | A1 | 7/2016 | Subbotin et al. |
| 2017/0299226 | A1 | 10/2017 | Buscheck |
| 2019/0280483 | A1 | 9/2019 | Ramamurthy |

FOREIGN PATENT DOCUMENTS

| | | |
|---|---|---|
| CA | 3038294 | 6/2019 |
| EP | 3039771 | 5/2018 |
| EP | 3422282 | 1/2019 |
| JP | 2017025730 A * | 2/2017 |
| WO | 2011119413 | 9/2011 |
| WO | 2013013174 | 1/2013 |
| WO | 2013109890 | 7/2013 |
| WO | 2013152138 | 10/2013 |
| WO | 2014092823 | 6/2014 |

OTHER PUBLICATIONS

PCT International Search Report and Written Opinion in International Appln. No. PCT/CA2020/000127, dated Feb. 1, 2021, 14 pages.

Cetin et al. in "Cryogenic energy storage powered by geothermal energy", vol. 77 Geothermics, 2018.

https://asmedigitalcollection.asme.org/memagazineselecl/article/ 137 /12/36/380449/Earth-BatteryCarbon-Dioxide-Sequestration-Utility.

https://en.wikipedia.org/wiki/Duck_curve; California.

NREL "Electricity Generation Baseline Report" (https://www.nrel.gov/docs/fy17osti/67645.pdf).

United States Department of Energy, (https://www.sbir.gov/sbirsearch/detail/1523867).

* cited by examiner

METHOD FOR ON DEMAND POWER PRODUCTION UTILIZING GEOLOGIC THERMAL RECOVERY

FIELD OF THE INVENTION

The present invention relates to closed loop energy recovery from a geologic formation having extractable heat and more particularly to a method for providing on demand energy using a closed loop production system.

BACKGROUND OF THE INVENTION

The previous activity in the geologic heat/power production art has been well documented. One of the early examples is found in United States Patent Publication 20120174581, Vaughan et al, published Jul. 12, 2012.

Other examples include United States Patent Publication 20070245729, Mickleson, published Oct. 25, 2005, McHargue, in United States Patent Publication 20110048005, published Mar. 3, 2011, Lakic, in U.S. Pat. No. 8,281,591, issued Oct. 9, 2012, and most recently U.S. Pat. No. 10,527,026, Muir et al, issued Jan. 7, 2020.

These references are representative of the progenitor developments in the thermal recovery for power production body of prior art. Although useful as such, they are not instructive or definitive in addressing power production demand issues and how these are intermingled with intermittent renewable energy sources.

Intermittent renewables have recently become competitively priced with fossil fuels, and now produce a large fraction (30-45%) of electricity in certain jurisdictions (California, Germany, etc).

These carbon-free sources have potential to dramatically reduce greenhouse gas emissions. However, there is a limit to how much solar/wind can be brought onto a power grid, driven by the inherent intermittency of the energy generation. These intermittent or variable generation sources are also referred to as non-dispatchable.

High penetration of solar/wind in power grids causes issues with system integration due to the difficulty of replacing the energy produced when the sun is not shining, and the wind is not blowing. This is epitomized in California which has high solar penetration and creates what is colloquially known as the "duck curve"; (https://en.wikipedia.org/wiki/Duck_curve).

Currently in California, solar plants cannot be built without some measure of energy storage, typically 2-4 hours of lithium-ion battery storage. However, true energy storage capability of 8 hours or more is prohibitively expensive.

A comprehensive report on electricity sources written by NREL "Electricity Generation Baseline Report" (https://www.nrel.gov/docs/fy17osti/67645.pdf) describes the issues in integrating non-dispatchable technologies. Currently, there is no viable solution to decarbonize the remaining approximately 50% of the grid.

Another problem with integrating intermittent renewable energy sources is that they tend to decline very rapidly, called downward fast-ramping. Accordingly, an important and valuable feature desired in dispatchable power sources is an upward "fast-ramping" capability to offset the quick declines from wind/solar. Many technologies lack this fast ramping ability (for example coal, nuclear, and some types of gas generation are not fast ramping).

The challenge is to develop a cost-effective energy system to dispatch the evening and night-time load when solar/wind are unavailable.

Traditional geothermal would seem a natural fit to provide renewable dispatchable power. However, traditional geothermal systems operate in a baseload fashion due to several fundamental issues which prohibit the ability to provide flexible/dispatchable power output.

Flow from the geothermal reservoir cannot be accelerated without incurring massive parasitic pumping losses. This is due to the Darcy-Flow and fracture-flow regimes within the rock reservoir; significant energy is required to accelerate flow rates above the normal baseload operating point.

The reservoirs can be pressurized however, this may cause loss of reservoir containment, induce fracturing and cause induced seismicity.

In addition to the parasitic losses which negate any gross power increase while ramping, in traditional geothermal there are numerous operational issues caused by ramping flow up and down significantly, sand production, liner failure, pump operating ranges, liquid/gas flow regime variability, thermal expansion and cooling processes causing geomechanical issues within the reservoir, injector well plugging, etc.

In a request for proposal from the United States Department of Energy, (https://www.sbir.gov/sbirsearch/detail/1523867), it was indicated:

"Dispatchable generation refers to sources of electricity that can be turned on or off, or can adjust their power output accordingly to an order. Geothermal plants are usually used for base-load power rather than dispatchable power. The 8 MW Puna Expansion Facility in Hawaii is the first fully dispatchable geothermal power plant (Nordquist et al., GRC Transactions, Vol. 37, 2013). As described by the Ormat team, the adaptation of a base load power plant to full dispatchability was not easy. The plant is required to adjust its power output quickly in response to a requested ramp rate and maintain its frequency within close tolerance to the grid power. This was a challenge for a geothermal plant because the heat source does not naturally respond quickly to changes in demand. To address this challenge, Ormat decided to maintain the geothermal fluid flows at relatively steady rates while providing a bypass around the generation equipment as needed. Under part load, some of the geothermal fluid is pumped to the surface, bypasses the generation equipment, and is re-injected to the ground without extracting any useful enthalpy. This approach is robust but necessarily incurs high parasitic power draws at part load due to the constant, full-flow pumping power requirements."

This geothermal reservoir (the subsurface system) in the above example is not produced at full capacity. The so-called dispatchability is, in reality, just operating with a low capacity factor, based on the geothermal subsurface capacity, or operating the system below the potential thermal output capacity of the geothermal system for most of the time and operating equal to the potential thermal output capacity when dispatching.

Other researchers have focused on using the subsurface as a storage medium for air—reservoir Compressed Air Energy Storage; CO2—in the article https://asmediqitalcollection.asme.org/memaqazineselect/article/137/12/36/380449/Earth-BatteryCarbon-Dioxide-Sequestration-Utility, or pressurized water. These systems all face similar drawbacks. The critical issue is they are open systems (the volume of working fluid within the system is constantly changing) and so suffer from the challenges of controlling and managing flow in porous media and extensive, variable fracture networks. Furthermore, they are primarily energy storage systems, rather than energy producing systems.

Still other researchers have looked at using Thermal Energy Storage, (TES), systems at surface to store heat produced by geothermal systems to optimize daily energy output to the end-user. However, a key challenge is the loss in temperature due to sensible heat exchangers, and the resulting lower round-trip efficiency. Furthermore, the installed cost of a large-scale TES for high temperatures suitable for electricity generation is currently prohibitive.

A much different, but still relevant field of prior art is low-temperature Underground Thermal Energy Storage systems. These come in two varieties, Borehole Thermal Energy Storage (BTES) and Aquifer Thermal Energy Storage (ATES). ATES and BTES are essentially low temperature heat-pump systems that store and drawdown seasonal energy, from summer to winter and vice-versa. BTES stores heat from air conditioning waste heat in the summer, via conductive heat transfer with the surrounding rock, then drawdown that heat in the winter. Both ATES and BTES are not energy-generating systems, or even simple energy storage systems. Rather they work in conjunction with an energy-driven heat pump and the full system is an energy consumer, although more efficient than standard AC and space heating technologies.

Cryogenic air storage is an attractive technology to store excess electricity generated by renewable systems and discharge when required. The round-trip efficiency of the storage technology increases when used in conjunction with geothermal heat. This type of integration has been investigated by some researchers, for example Çetin et al in "Cryogenic energy storage powered by geothermal energy", vol 77 Geothermics, 2018).

The above academic paper considers a geothermal system which is operated in a baseload fashion, rather than a dispatchable geothermal system disclosed herein. The primary challenge of this methodology and other prior art is that the cryogenic discharging happens over several peak hours, however the geothermal heat output is baseload (i.e. flat output over 24 hours).

What is required to ameliorate the issues with current technologies and baseload limitations is a new paradigm that provides on demand power to an end user at any time and supplements and optimizes intermittent renewables when required.

The present technology to be discussed further herein addresses all of the issues currently in power generation, infrastructure and distribution without reliance on baseload sources, non-dispatchable renewables, or batteries.

SUMMARY OF THE INVENTION

One object of one embodiment of the present invention is to provide a method to produce dispatchable, scalable and fast-ramping electricity utilizing a closed-loop engineered geologic thermal recovery system.

A further object of one embodiment of the present invention is to provide a geothermal power output system having baseload distribution substantial equivalent with oscillated discontinuous output cycles averaged over a distribution period.

Another object of one embodiment of the present invention is to provide a method for optimizing the characteristic potential thermal output capacity of a well system including a working fluid capable of thermal charging from the formation, the system having an inlet well and an outlet well and disposed within a formation having the characteristic potential thermal output capacity, comprising: modulating circulation of the working fluid within the well system to oscillate thermal output from thermally charged working fluid about the characteristic predetermined potential thermal output capacity, where the averaged oscillated thermal output substantially equates with the predetermined potential thermal output capacity of the formation.

In this embodiment, the thermal output is inconstant and is cycled between a charging operation where the working fluid is thermally charged through conductive heat transfer from the formation and a discharging operation where the thermal energy is removed for processing.

Processing may comprise conversion to at least one of electrical energy, heat energy and combinations thereof.

In respect of the modulation, this may take many forms including at least one of variation in flow rate of the working fluid, residency time in the system, oscillation duration, thermal charging duration, thermal discharging and combinations thereof.

Practice of the method allows for generating on demand energy to an end user through interaction between the charged working fluid and a power generation device.

A further object of one embodiment of the present invention is to provide a method for providing on demand power to an end user with a well system having an inlet well, an outlet well in a thermally productive geologic formation, comprising: forming a closed loop with a power generation device operatively connecting the inlet and the outlet; circulating a working fluid in the loop with a predetermined residency time to thermally load circulating working fluid through conduction from the formation; and modulating the flow rate of thermally loaded working fluid within the loop for power generation based on user demand.

Depending on the specific parameters attributed to the formation, the inlet well and the outlet well may be operatively and fluidly connected with a interconnecting section being disposed for conduction in the thermally productive geologic formation.

For enhancing thermal recovery and networking of well systems amongst a host of other advantages, the inlet well and the outlet well may be connected with a plurality of interconnecting sections in a predetermined pattern within the formation. Owing to Applicant's patented and published technologies, patterning of the well systems, interconnecting segments, networks of well systems is simplified and unrestricted from a systems design perspective.

For power creation, output management and dispatchability, selective modulation of the circulation of the working fluid may be conducted within predetermined sections of the plurality of interconnecting sections of the well system to oscillate thermal output from thermally charged working fluid about a characteristic predetermined potential thermal output capacity of the formation, where the averaged oscillated thermal output substantially equates with said predetermined potential thermal output capacity of said formation.

Where the well system includes a plurality of well systems with a plurality of interconnecting sections, selective modulation of the working fluid may be effected in the individual interconnecting sections of the well systems, in some or all of the interconnection sections at specific times and in specific sequences as well with adjacent well systems in a user selected manner.

The method is predicated on flexibility in deployment and accordingly, any geologic formation having a temperature of greater than 90° C. can be exploited regardless of the type of rock, i.e. high permeability, low permeability, hot dry rock, a geothermal formation, a sedimentary formation, a volcanic formation, a variable permeability formation and combinations thereof. In furtherance of the flexibility, the methodology is not limited by rock formation incongruities, i.e. naturally fissured, fractured or cracked rock, synthetically fissured, fractured or cracked rock and combinations thereof. The method can be applied in any scenario.

In respect of a working fluid, a desirable fluid may be water which may include a drag reducing additive such as a surfactant, a polymeric compound, a suspension, a biological additive, a stabilizing agent, anti-scaling agents, anti-corrosion agents, friction reducers, anti-freezing chemicals, biocides, hydrocarbons, alcohols, organic fluids and combinations thereof.

Other suitable fluids may comprise super critical carbon dioxide, lower alkanes, e.g. C1-C10, fluids containing phase change materials, refrigerants. The examples are numerous and readily derivable from the prior art.

Additives to promote the maintenance of the well system are contemplated for use in the working fluid as are compounds to augment the thermodynamic efficiency of the working fluid.

Yet another object of one embodiment of the present invention is to provide a method for providing on demand energy to an end user with a geothermal mechanism, the mechanism including an inlet well, an outlet well and an interconnecting section there between in a geologic formation, comprising: forming a closed geothermal loop with a power generation device connecting the inlet and the outlet; circulating a working fluid in the loop with a predetermined residency time to thermally load circulating working fluid through conduction from the formation; and adapting the flow rate of thermally loaded working fluid within the loop based on user demand.

The geothermal wells and interconnecting section may be newly formed or existing. If existing, the methodology herein can be easily adapted to retrofit an existing installation for enhanced efficiency.

The energy may be electrical or heat energy depending on the proposed end use with residency time sufficient to facilitate power generation for the duration of a user's demand.

Interaction between the charged working fluid and a power generation device within the loop includes minimizing residency time by increasing the flow rate of the charged working fluid.

For further added efficiency, thermal energy from the charged working fluid may be stored in the geothermal formation and the working fluid may be supplemented with energy charged working fluid from adjacent wells in the formation. The supplementation may take the form of rerouting working fluid from adjacent wells to a well and power generation device under user demand.

Yet another object of one embodiment of the present invention is to provide a method for delivering on demand power to an end user, comprising: providing an inlet well, an outlet well and a well interconnecting section between the inlet well and the outlet well and being disposed within a geologic formation having a temperature of at least 90° C., the formation having a predetermined potential thermal capacity; implementing a closed loop arrangement within the formation through connecting the outlet well to a power generation device to recover energy from the well arrangement in a closed loop between the wells and the power generation device, the closed loop arrangement having a predetermined energy output within available potential thermal capacity; circulating a working fluid within the loop with predetermined residency time at least within the interconnecting section to maximize energy transfer from the formation to form an energy charged working fluid; and generating on demand energy to an end user through interaction between the charged working fluid and the power generation device.

Consistent with the flexibility already established herein with the method, the interconnecting section(s) may be cased, uncased, lined, chemically treated for augmented conductivity, chemically sealed, self-healing when sealed, thermally sealed, include single pipe optionally perforated, coaxial pipe optionally perforated and combinations thereof in a continuous or discontinuous configuration. The working fluid can be designed to maintain wellbore integrity by sealing fractures or generated permeability. If the wellbore is at risk of breakouts or compressive failure, the fluid density may be increased to provide sufficient compressive strength on the formation. Conversely, if the formation is cooled sufficiently it may be at risk of tensile failure, in which case the fluid may be selected to have reduced density.

The working fluid may be circulated within the loop at varying flow rates to oscillate thermal output about the predetermined energy output capacity, to produce on demand power where the average thermal output may equal the predetermined potential thermal output capacity.

In alternative embodiments, a plurality of interconnecting sections (multilaterals) common to the inlet well and the outlet well are disposed in a configuration to maximize thermal recovery from a heat gradient of said formation. If a footprint for the arrangement is an issue, the inlet and outlet wells may be co-located.

In further alternative embodiments and to exploit the thermal gradient within the formation, the interconnecting sections may be arranged symmetrically relative to adjacent interconnecting sections, asymmetrically relative to adjacent interconnecting sections in interdigital relation to adjacent interconnecting sections, in coplanar relation to adjacent interconnecting sections, in parallel planar relation to adjacent interconnecting sections, in isolated or grouped networks and suitable combinations thereof.

For purposes of improved distribution which will be further elucidated herein after, a plurality of closed loops with outlet wells of adjacent loops may be selectively connected to inlet wells of additional wells taking the form of a daisy chain configuration which further may be valved for user selectivity.

Another object of one embodiment of the present invention is to provide a method for optimizing power distribution on a pre-existing grid, comprising: providing an intermittent power production arrangement having a designed maximum power production quantity and a second effective power production quantity on the pre-existing grid; positioning an energy recovering and producing closed loop within a thermal bearing geologic formation adjacent the intermittent power production arrangement, the loop including an inlet well, outlet well, interconnecting segment between the inlet well and the outlet well, the interconnecting segment positioned in the formation to facilitate thermal recovery in the formation, the formation having an available potential thermal capacity; positioning the closed loop in a configuration within the formation to produce a predetermined energy output from the available potential thermal capacity; circulating a working fluid within the loop with a predetermined residency time to thermally charge circulating working fluid through conduction from the formation; and selectively thermally discharging the working fluid through the intermittent power production arrangement to increase power production to a quantity above the second effective power production quantity and below the designed maximum power production quantity, whereby overall power production is optimized using the pre-existing grid.

The intermittent power production arrangement and the energy recovering and producing closed loop may be positioned on a common geographic footprint to produce on demand energy.

Selective thermal discharging of the working fluid through the intermittent power production arrangement is effected during periods of significant user power demand and transmitted using the transmission capacity and infrastructure of the pre-existing grid of the intermittent power production arrangement. The intermittent sources are widely known as wind, solar and battery sources.

A still further object of one embodiment of the present invention is to provide a power production method, comprising: providing a power transmission grid for transmitting produced power to an end user, the grid having an output capacity; providing a power production arrangement having a designed maximum power production quantity and a second effective power production quantity on the grid; positioning an energy recovering and producing closed loop within a thermal bearing geologic formation adjacent the intermittent power production arrangement, the loop including an inlet well, outlet well, interconnecting segment between the inlet well and the outlet well, the interconnecting segment positioned in the formation to facilitate thermal recovery in the formation, the formation having an available potential thermal capacity; positioning the closed loop in a configuration within the formation to produce a predetermined energy output from the available potential thermal capacity; circulating a working fluid within the loop with a predetermined residency time to thermally charge circulating working fluid through conduction from the formation; and selectively thermally discharging the working fluid through the power production arrangement to maintain power production to the capacity throughout the power transmission grid.

The power transmission grid may include a plurality of separate distribution zones for distribution of power over a geographic area with at least some of the zones including an energy recovering and producing closed loop.

Accordingly, a further object of one embodiment of the present invention is to provide a power plant for providing user predetermined power distribution, comprising: a thermal energy recovery apparatus configured to modulate the circulation of a working fluid in a thermally productive formation whereby thermal energy is transferred into the working fluid, the apparatus for oscillating discontinuous output cycles averaged over a distribution period; and distribution apparatus for distributing averaged power output as a user predetermined power output.

Having thus generally described the invention, reference will now be made to the accompanying drawings.

BRIEF DESCRIPTION OF THE DRAWINGS

Similar numerals used in the Figures denote similar elements.

DETAILED DESCRIPTION OF THE PREFERRED EMBODIMENTS

Figure 1:
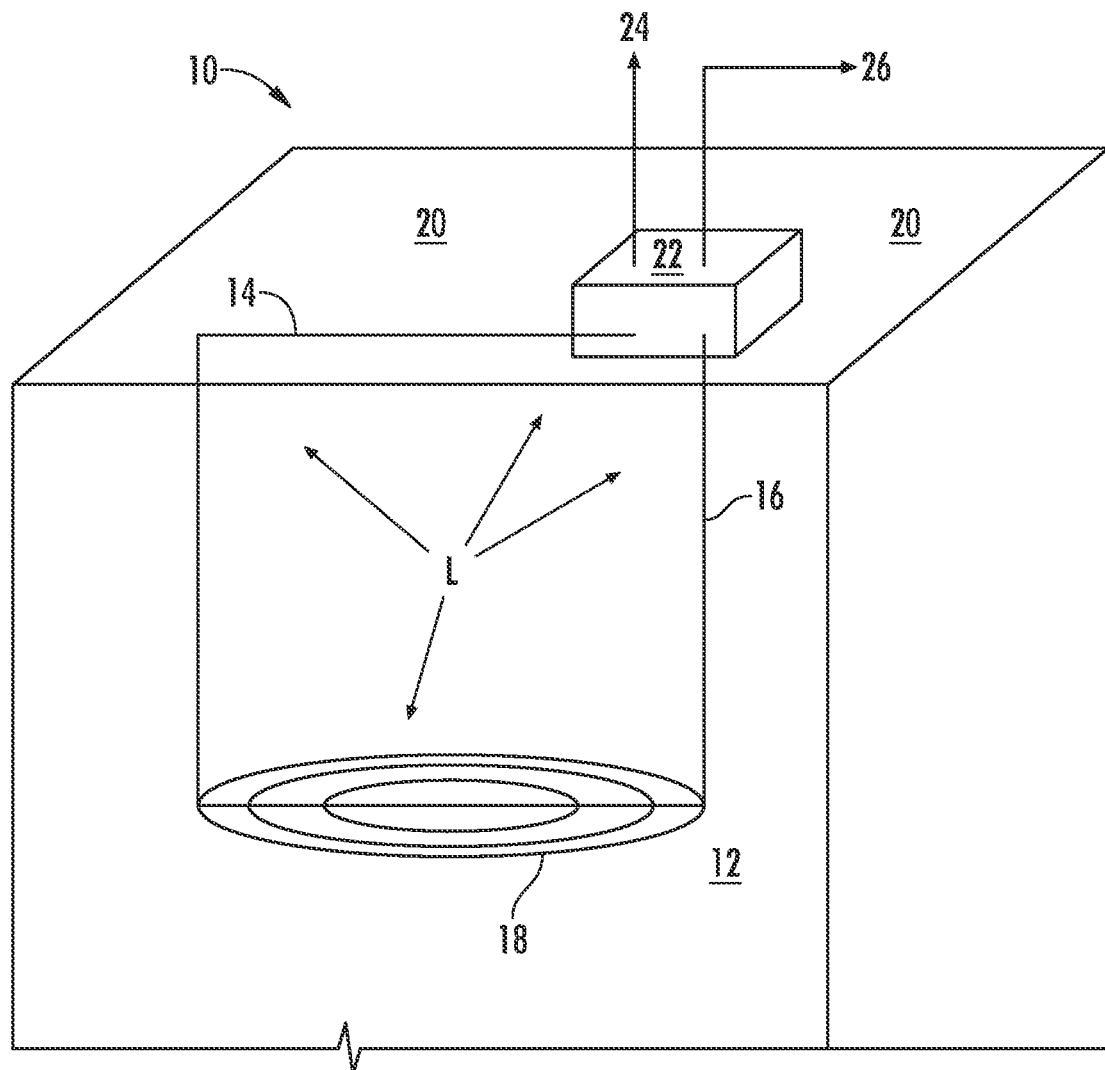
FIG. 1 is a schematic illustration of an energy recovery arrangement disposed in a thermal bearing geologic formation.
Figure 2A:
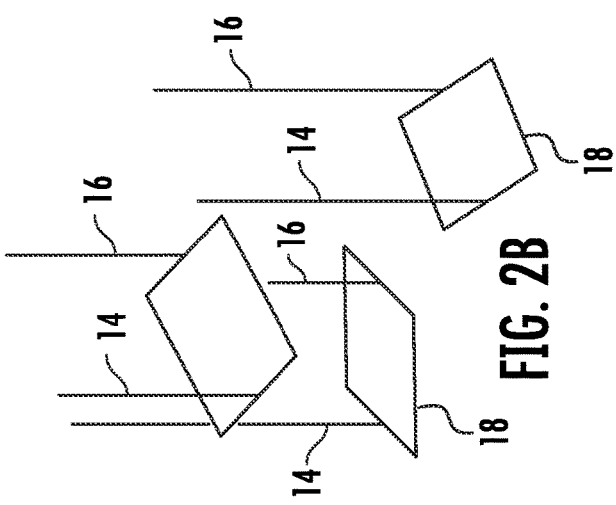
FIGS. 2A through 2D are schematic illustrations of alternative interconnecting sections or multilateral sections for use in the recovery arrangement.
Figure 2B:
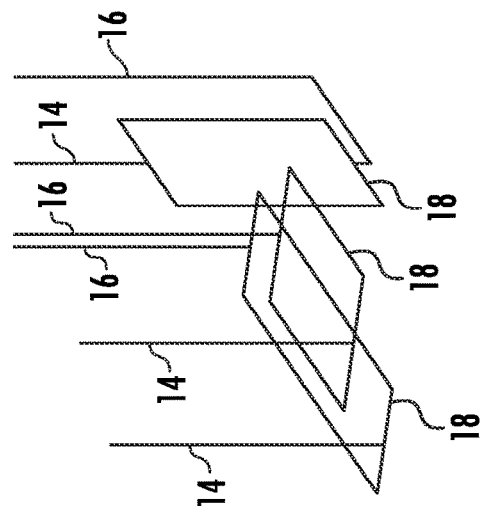
Figure 2C:
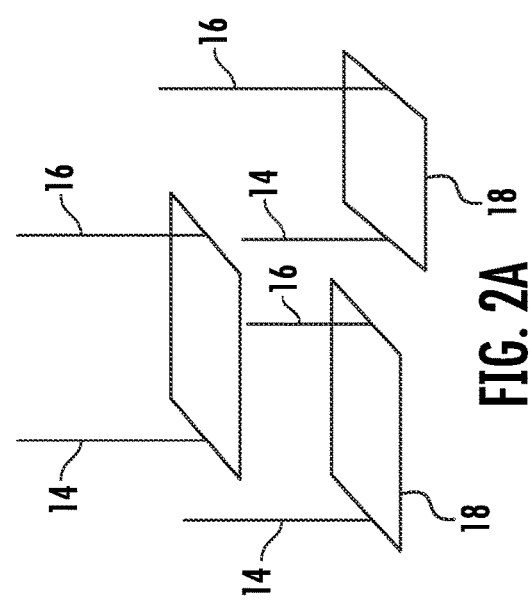
Figure 2D:
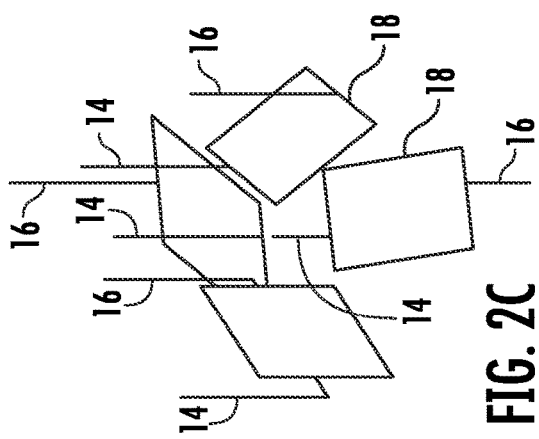

Referring now to the drawings, FIG. 1 illustrates an example of the overall arrangement used to practice embodiments of the methods to be delineated herein. Numeral 10 globally references the overall arrangement. A geologic formation 12 having thermal energy having a temperature of at least 90° C. and which may be and typically above 150° C., or even 600° C. or greater, includes a subterranean loop arrangement having an inlet well 14 and an outlet well 16, which may be co-located, interconnected with at least one interconnecting section 18. In the example, several sections 18 are depicted. The thermal gradient will depend on the formation characteristics.

At the surface 20, inlet 14 and outlet 16 are connected to a power generation device 22. Device 22 completes the loop arrangement as a closed loop which will be referenced for simplicity as L. As will be evident, the sections 18 are disposed within the geologic formation for the purpose of recovering thermal energy from the surrounding formation 12. For clarity, the closed loop, L, and particularly, sections 18 may include fissures, fractures, cracks within which fluid may be transported, however, this will not detract from the point of the closed loop concept; despite the fact that there may be localized multidirectional flow anomalies, the flow pattern remains closed in the inlet, interconnect, outlet, power generation device 22 combination of elements.

The geologic formation may be any formation that provides a temperature as noted above. In this regard, examples include a geothermal formation, a low permeability formation, hot dry rock, a sedimentary formation, a volcanic formation, a high temperature formation, a variable permeability formation and combinations thereof. These are examples only; any number of others are within the purview of the invention.

The formation, depending on its nature will have a predetermined potential thermal output capacity which can be analyzed in advance by suitable techniques known to those skilled in the art. Each formation will, of course, have a different output capacity.

In consideration of this, each loop, L, will have a predetermined potential thermal output capacity which is reflective of its design parameters, such as number of sections 18, geometric arrangement thereof, depth, length, formation temperature, formation rock properties, inter alia. All of these parameters will be apparent to those skilled.

For recovery, a working fluid is circulated through the loop, L, and exits the outlet well 16 flows through power generation device 22 which converts thermal and/or kinetic energy into electricity for use by an end user globally referenced with numeral 24 and/or is redistributed at 26 for alternate uses to be discussed herein after. Once circulated as indicated, the working fluid is reintroduced to the inlet 14.

The working fluid is thermally "charged" or loaded by circulating the working fluid through the closed-loop, L, at a relatively low flow rate during the charging period. The residence time of the working fluid within the subsurface flow path is increased, and hence the fluid is heated up to a high temperature via conductive heat transfer with the surrounding formation 12.

The system is "discharged" by increasing the flow rate significantly and flushing out the volume of heated working fluid within the hot subsurface portion of the closed circuit, L.

The working fluid may comprise water, super critical carbon dioxide, etc., and include a drag reducing additive such as a surfactant, a polymeric compound, a suspension, a biological additive, a stabilizing agent, anti-scaling agents, anti-corrosion agents, friction reducers, anti-freezing chemicals, biocides, hydrocarbons, alcohols, organic fluids and combinations thereof. Other suitable examples will be appreciated by those skilled. It is contemplated that the working fluid may be compositionally modified dynamically where changing subsurface thermal characteristics dictate.

Referring now to FIGS. 2A, 2B, 2C and 2D, shown are schematic illustrations of the possible dispositions and combinations of the interconnecting sections 18. The illustration generally shows that the adjacent interconnecting sections may be symmetrical, asymmetrically relative to adjacent interconnecting sections, in interdigital relation to adjacent interconnecting sections, in coplanar relation to adjacent interconnecting sections, in parallel planar relation to adjacent interconnecting sections, in isolated or grouped networks and combinations thereof. Specific geometric disposition will vary on the temperature gradient characteristics. The Figures are exemplary only; suitable variations will be appreciated by the designer.

Figure 3:
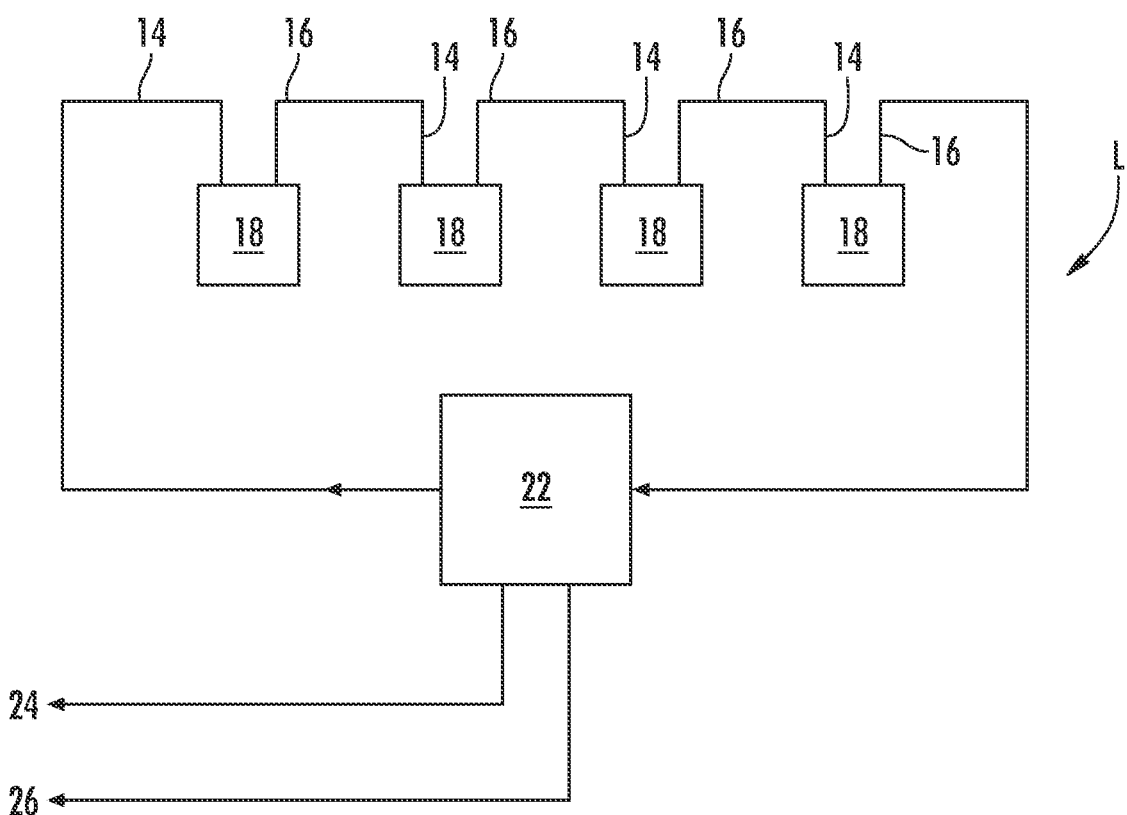
FIG. 3 is an alternative for the recovery arrangement.

FIG. 3 illustrates an example where the loop, L, includes a plurality of interconnecting sections 18 with the output 16 of one section 18 serves as the input 14 of an adjacent section 18 with common collection at power generation device 22. In this manner the loop, L, is subdivided into a daisy chain configuration for operation of the method.

The potential thermal output capacity is the maximum sustainable thermal energy output of the system. Thermal output may be varied temporarily with the methodology disclosed herein, but the long-term average output (i.e. averaged over months or years) cannot exceed the potential thermal output capacity.

The overall geothermal efficiency of a system is equal to the average thermal output divided by the potential thermal output capacity, what is typically referred to as geothermal "capacity factor". It is advantageous to have a high capacity factor, or high utilization of the available potential thermal output capacity. Conventionally this is achieved by constant thermal output at or near the potential thermal output capacity. Many geothermal systems operate at >90% capacity factor in this manner, sometimes referred to as "baseload" operations. The disclosed methodology enables a high geothermal capacity factor while also providing flexible on-demand energy output rather than a constant output.

Figure 4:
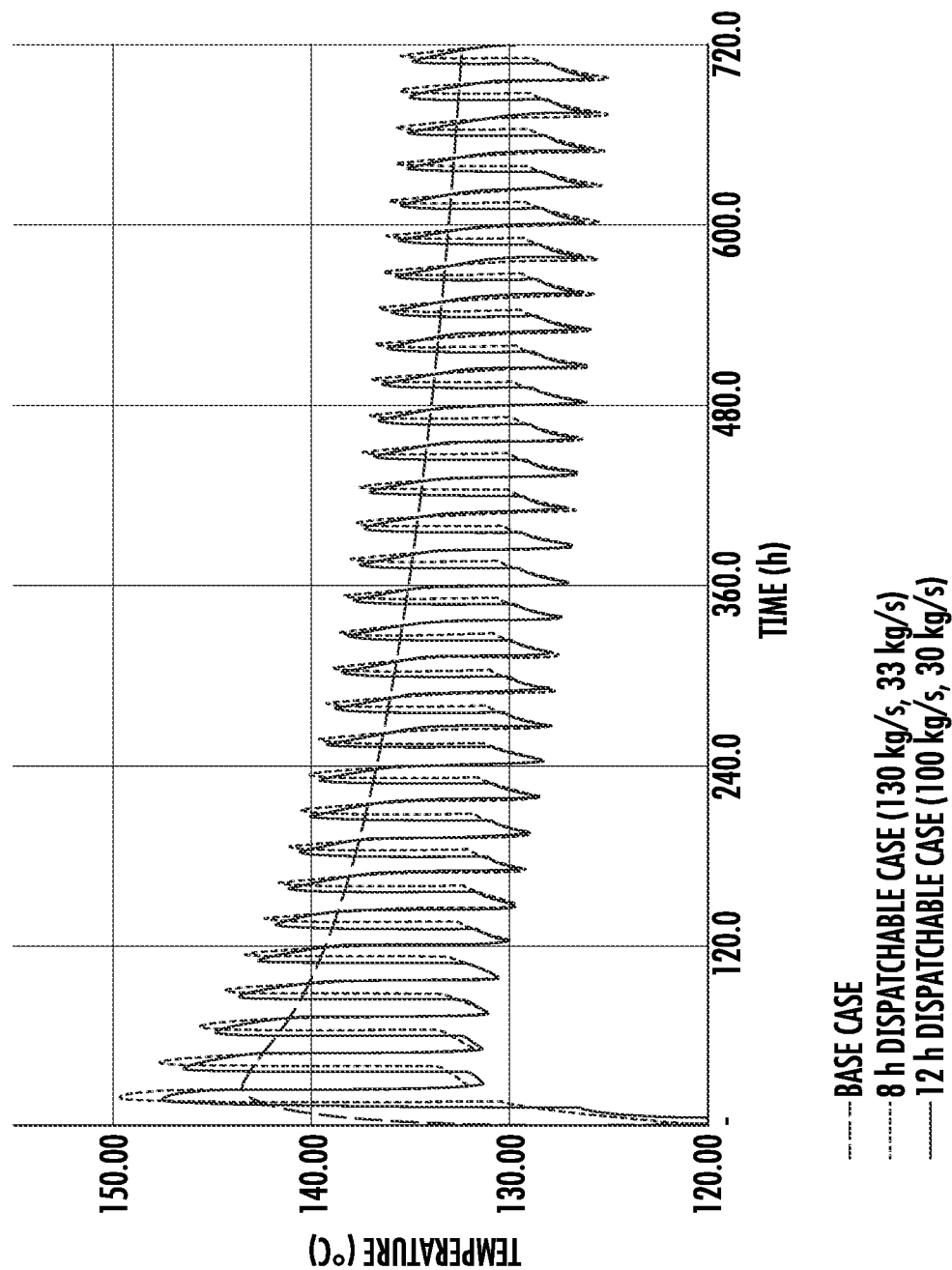
FIG. 4 is a graphical representation of a series of operating scenarios depicting temperature (thermal output) as a function of time for each scenario.

FIG. 4 illustrates an example based on transient thermodynamic modelling of a closed-loop multilateral system described in Applicant's co-pending Application No. PCT/CA2019000076, among others. The inputs for the thermodynamic model are tabulated below.

FIG. 4 Example Data

|  | Vertical In | Vertical Out | Laterals |
|---|---|---|---|
| Total Length | 4810 | 4810 | 5648 |
| Casing ID (mm) | 215.9 | 215.9 | 215.9 |
| Casing OD (mm) | 244.5 | 244.5 | NA |
| Cement OD (mm) | 298.5 | 298.5 | NA |
| Rock Thermal Conductivity (W/m. K) | 3.2 | 3.2 | 3.2 |
| Roughness (mm) | 0.05 | 0.05 | 0.15 |
| Elevation In | 0 | −4415 | −4415 |
| Elevation Out | −4415 | 0 | −4415 |
| Number of lateral legs | 12 |  |  |
| Surface Temperature (° C.) | 10 |  |  |
| Temperature Gradient (° C.) per km | 34.3 |  |  |
| Bottom Hole Temperature (° C.) | 161.3 |  |  |
| Rock Density (kg/m3) | 2663 |  |  |
| Rock Specific Heat (J/kgK) | 1112 |  |  |

The figure shows three operating scenarios for the same geothermal loop: operating in a baseload manner with a constant flow rate (Base Case), in which case the thermal output equals the potential thermal output capacity; operating with a charging cycle for 16 hours at 33 kg/s and then discharging for 8 hours at 130 kg/s; and operating with a charging cycle for 12 hours at 30 kg/s and then discharging for 12 hours at 100 kg/s.

Typically, the charging cycle would be done when the energy price is low or there is an excess of variable renewable supply. This allows the interconnecting sections 18, referenced herein previously to recover the thermal energy from the formation.

Figure 5:
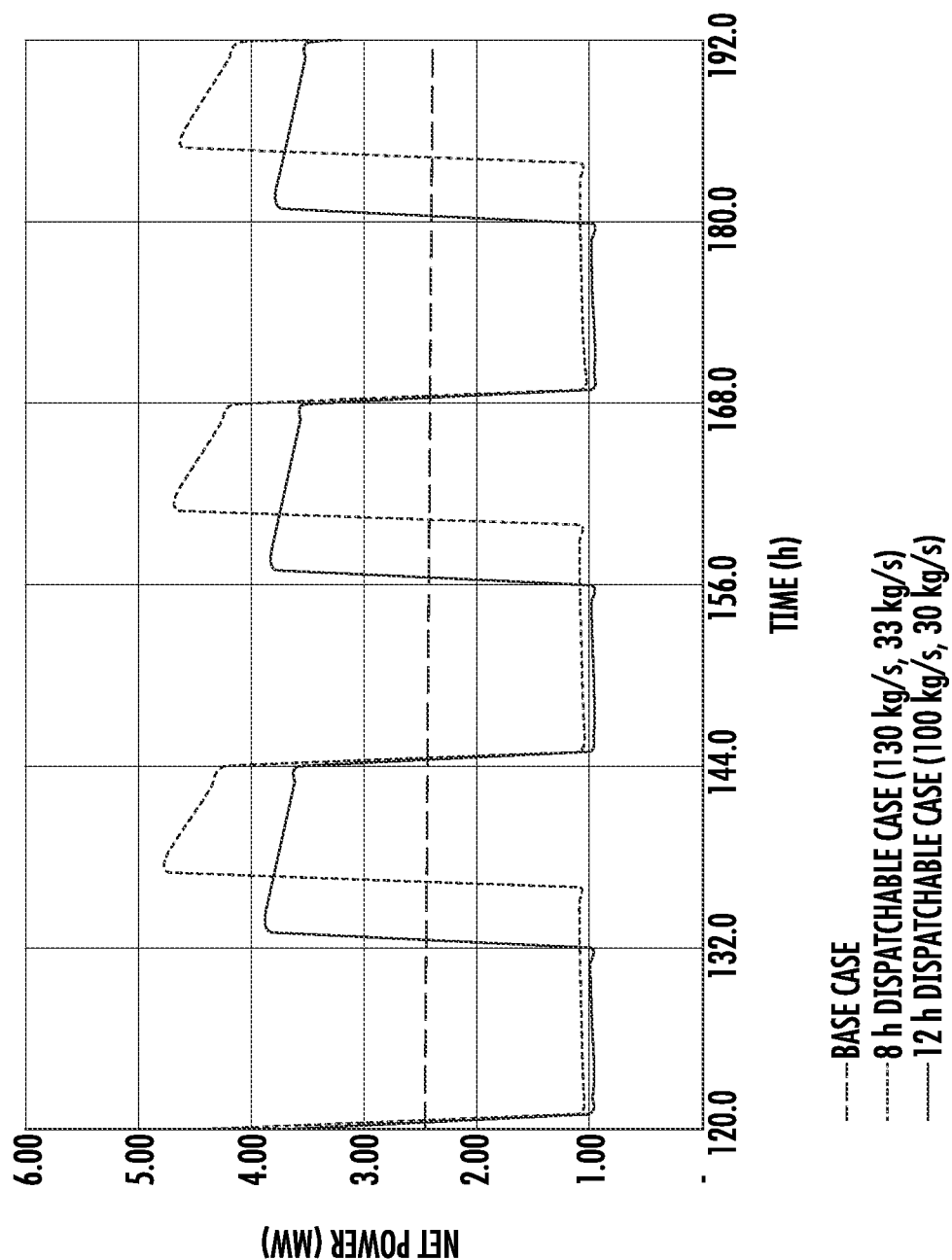
FIG. 5 is a graph, similar to that in FIG. 4, with the data presented over several days.

FIG. 5 illustrates focused details over the timeframe of 3 days. The average flow rate over the combined charge/discharge periods is approximately equal to the optimum fixed flow rate if the system was operated in a baseload manner. In this example, the same subsurface well arrangement as noted in the earlier Figures, if it were operated in a baseload manner, would equal the potential thermal output capacity at all times when the flow rate is equal to 60 L/s. In the vernacular, the system would operate at the full subsurface geothermal capacity. This is a critical differentiator from some prior art (Ormat at Puna) where the average geothermal output over combined "charging" and "discharging" cycles is significantly below long-term capacity.

The charging cycle establishes a strong thermosiphon, driven by the density difference of the cold fluid in the inlet well 14 compared to the hot fluid in the outlet well 16. During the charging cycle, the thermosiphon pressure drive is higher than required to maintain the desired flow rate. Flow rate is therefore controlled by choking flow downstream of the outlet well 16, using a flow-control valve or other apparatus (not shown) to apply a pressure-drop. The flow-control valve is automated and may be controlled with software that uses a thermodynamic model to calculate the required position of the valve. The control valve also helps manage the pressure in the subsurface loop, to keep it within desirable bounds based on the density of the working fluid and pump discharge pressure.

When discharging, flow rate can be immediately increased by releasing the choke (opening the control valve).

This near-instantaneous increase in flow rate enables a fast-ramping capability. Flow rate can be increased to until the hydraulic pressure losses through the closed circuit loop equal the thermosiphon pressure drive.

Flow can be increased beyond this level using a pump, which would require a parasitic power load. However, as long as the majority of the pressure drive is generated by the thermosiphon effect, the parasitic load is practically acceptable.

Using these methodologies, flow rate can be controlled to match power output to the end-user demand, through both the charging and discharging cycles and residency time of the working fluid in the loop.

In the prior art traditional open geothermal systems or flow in porous media, the pumping pressure required to reach the high flow rates while discharging cause an unacceptably high parasitic pump load and drastically reduce or eliminate any gains in net power output. It has been found that the practical limit is achieved when the ratio of the pressure losses in the circuit to the thermosiphon pressure drive is approximately 1.5. The system must be designed to have a hydraulic pressure loss less than 1.5 times the thermosiphon pressure drive. Ideally, pressure losses are less than 1 times the thermosiphon drive and the entire flow is driven by the thermosiphon. Accordingly, there is no parasitic pump load.

Energy is stored within the working fluid itself. During the charging cycle, sufficient residence time is required to heat the working fluid enough to accommodate the discharge cycle. For example, if the discharge cycle is typically 8 hours long, the fluid circuit transit time must be at least 8 hours (averaged over both discharge and charge cycles).

During the charging cycle, energy can also be stored temporarily in rock adjacent to the subsurface flow path and outlet well 16. At low flow rates, heat is transferred conductively from hotter rock in the formation 12 into the working fluid and as the fluid progresses through the system, it encounters cooler rock (typically shallower, for example in the outlet well 16), where energy is transferred from the fluid to the cooler rock and stored temporarily. During the discharging cycle, the average fluid temperature drops, and the stored heat is transferred back into the working fluid.

A closed loop avoids the operational problems with traditional geothermal systems, which are exacerbated when varying the flow drastically as discussed herein. For example, common operational issues are caused by brine, solids, scaling, plugging, and dissolved gases.

The dispatchability disclosed herein integrates well with cryogenic air storage (CES), hydrogen production, or other systems that use stored electrical energy. An example of the process flow is shown below. The CES charging cycle can use cheap excess power from the grid or co-located renewables (for example, solar during the peak daytime hours). The CES can also use produced geothermal power to charge but is not necessary. In one embodiment, the geothermal system would generate a fixed amount electricity throughout the charge and discharge cycle. The increase in thermal energy produced during the discharge cycle is directed to heat the air stream from the CES process, prior to expansion in a turbine.

There are several advantages when using CES with dispatchable geothermal:

The heat engine (which converts thermal energy to electricity) is only sized for the charge cycle, not the peak output of the discharge cycle, dramatically reducing equipment and capital costs.

Minor additional facilities are required to supply heat to the CES facility.

CES is discharging only over several peak hours in the day. The dispatchable geothermal system discharging cycle can match the CES discharging cycle.

Figure 6:
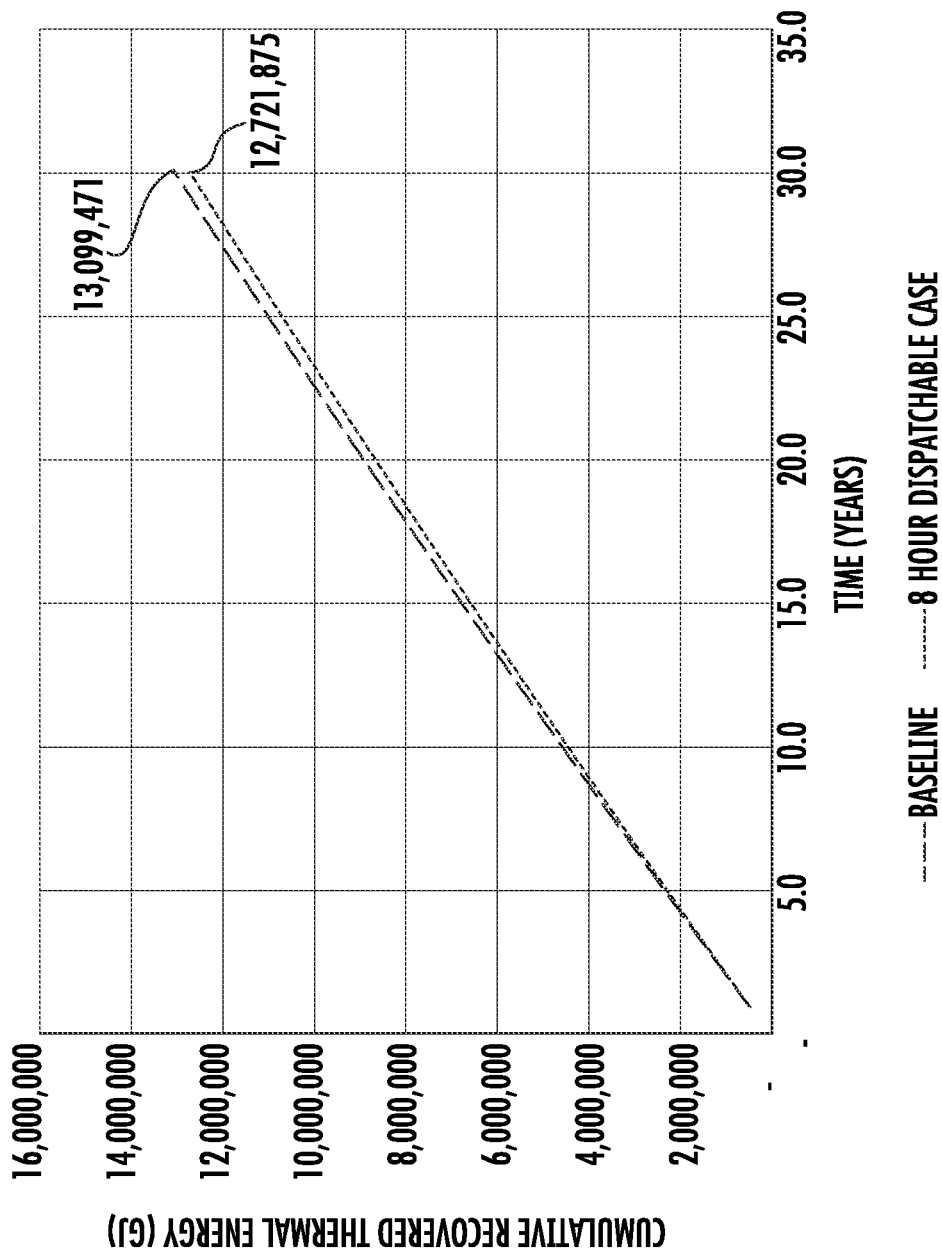
FIG. 6 is a schematic illustration of the thermal output over 30 years of specific scenarios referenced in FIGS. 4 and 5.

FIG. 6 illustrates the thermal output over 30 years of the "Base Case" and "8 Hour Dispatchable Case" referred to in previous Figures. The base case is operated in baseload manner and equal to the available thermal output capacity, while the "8 Hour Dispatchable Case" obtains an effective capacity factor of ~97% despite operated in a dispatchable output and thus substantially equates with the predetermined potential thermal output capacity of the formation.

This illustrates the primary invention, that the output can be made dispatchable while still retaining a high geothermal capacity factor, typically over 80% and approaching 100%.

The transient thermodynamic simulations described above were tested in a prototype geothermal system in central Alberta, Canada. The system includes a multilateral U-tube heat exchanger 2.4 km deep and 2.5 from surface site to site. The results validate the modelling and demonstrate dispatchability can be predicted and controlled by modulating the flow rate using, in this embodiment, an automated control valve at the outlet well. The empirical results confirm that the system is very fast ramping and when combined with a power generation system such as an Organic Rankine Cycle (ORC), can meet the fast-ramping requirements of integrating with Solar systems.

Figure 7:
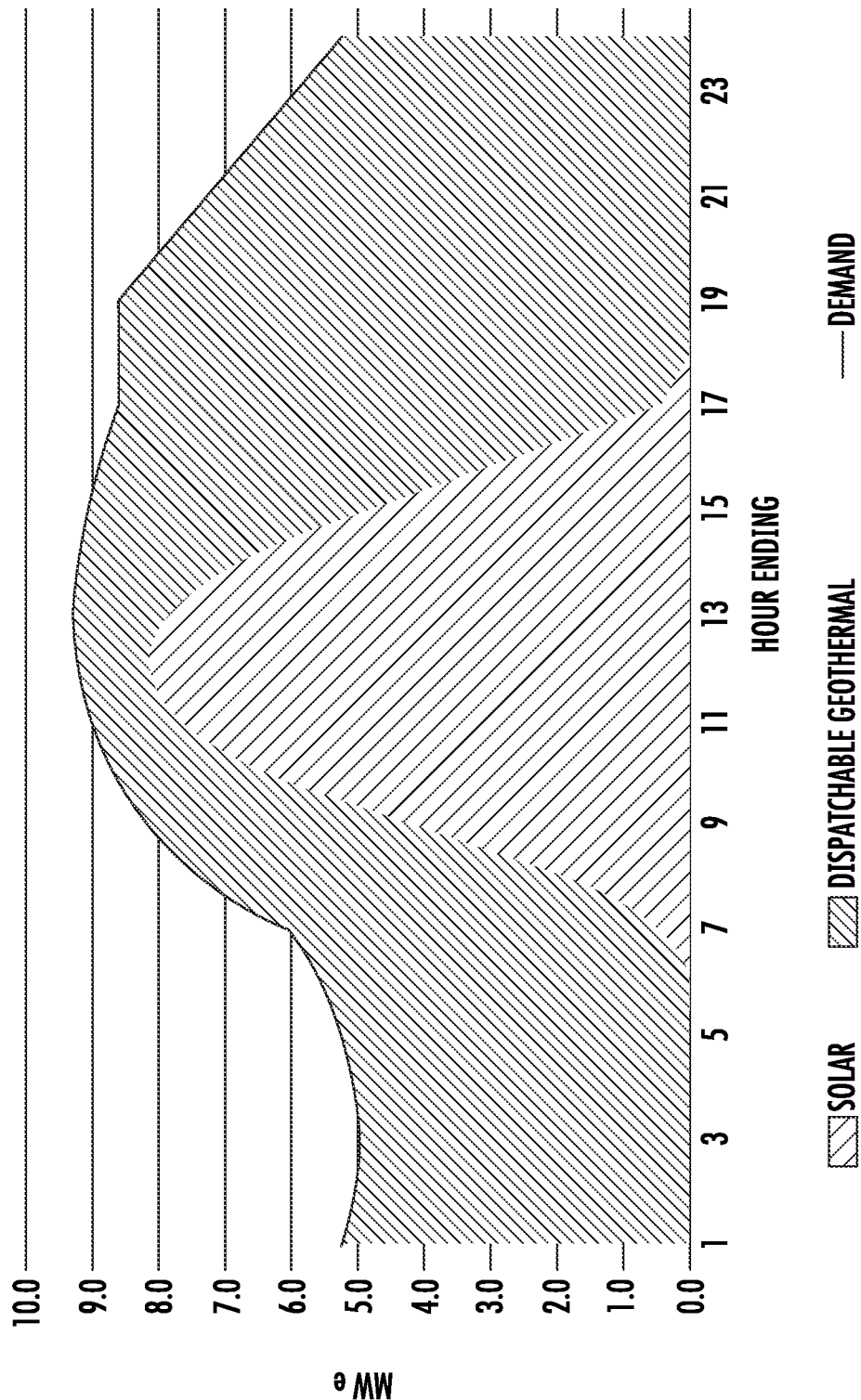
FIG. 7 is a schematic illustration of a dispatchable geothermal system integrated with other non-dispatchable renewables.

FIG. 7 demonstrates how the dispatchable geothermal system is used when integrated with other non-dispatchable renewables. The system is turned down during peak hours for Solar and ramped-up as Solar declines. The dispatchable geothermal fills the gap between the energy demand and the non-dispatchable renewables. This is only an example and the output can be modified to match any combination of charging/discharging cycles and the flow rate can be varied to meet any shaped output within physical limits.

Solar electricity is used as an example, however, the same dispatchable mechanisms can be used to integrate into direct heat use applications such as district heating systems or in district cooling systems.

Figure 8:
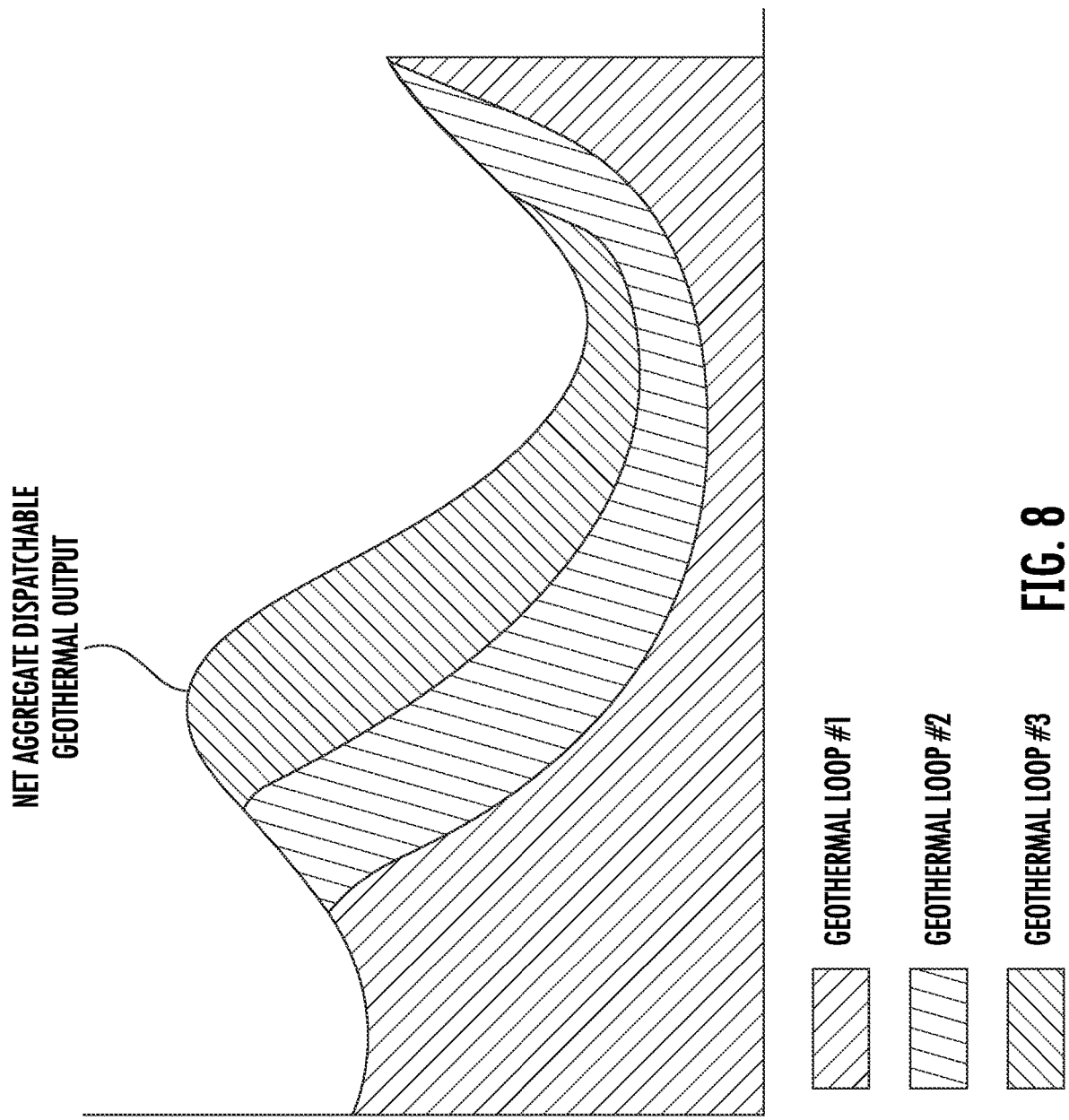
FIG. 8 is a schematic illustration of multiple dispatchable geothermal loops in a network.

FIG. 8 illustrates multiple dispatchable geothermal loops in a network. The charge/discharge cycles may be scheduled for each loop so that the aggregate output meets the required shaped output profile. The flow rate, thermosiphon, and temperatures are controlled in each loop using an automated control system coupled to a thermodynamic model. The charge discharge cycles may be sequenced or simultaneous depending on the situation and the parameters of each loop.

Figure 9:
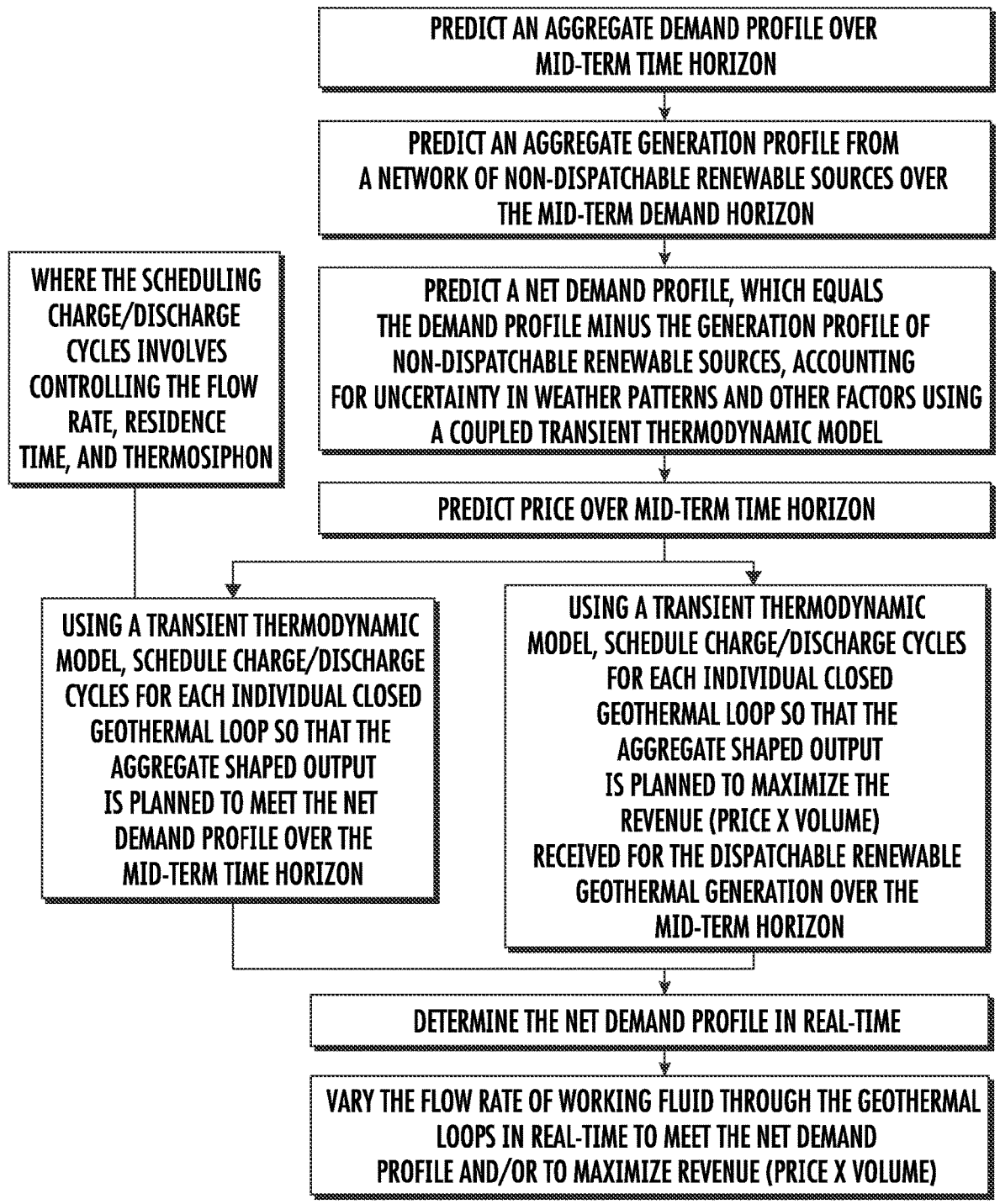
FIG. 9 is a flow diagram illustrating the process to plan, control, and optimize the integration of non-dispatchable renewables with a dispatchable geothermal system.

FIG. 9 is a process flow diagram to plan, control, and optimize the integration of non-dispatchable renewables with dispatchable geothermal. Providing an electrical grid system that has a demand profile over time, existing supply profiles from varying non-dispatchable renewable sources like PV, Wind, Baseload Nuclear, etc, the control technology optimizes a network of dispatchable renewable geothermal generators to fill the gap between the existing non-dispatchable supply profile and the demand profile. The optimization parameter can be to meet net demand, or it can be to maximize the price or revenue (price multiplied by volume) received, or any other combination of factors. These may form only a part of the optimization/scheduling algorithm.

In a network of dispatchable geothermal loops, a network of power generation modules (not shown) would be utilized which convert potential and thermal energy into electricity. These power generation systems may be ORCs, flash plants, pressure drive systems, direct turbines, or any other conversion means. The power generation modules may be arranged in series or parallel or a combination. The control system directs flow from each geothermal loop to the appropriate conversion module(s) based on proximity, scheduling, temperature, and other relevant factors.

Figure 10:
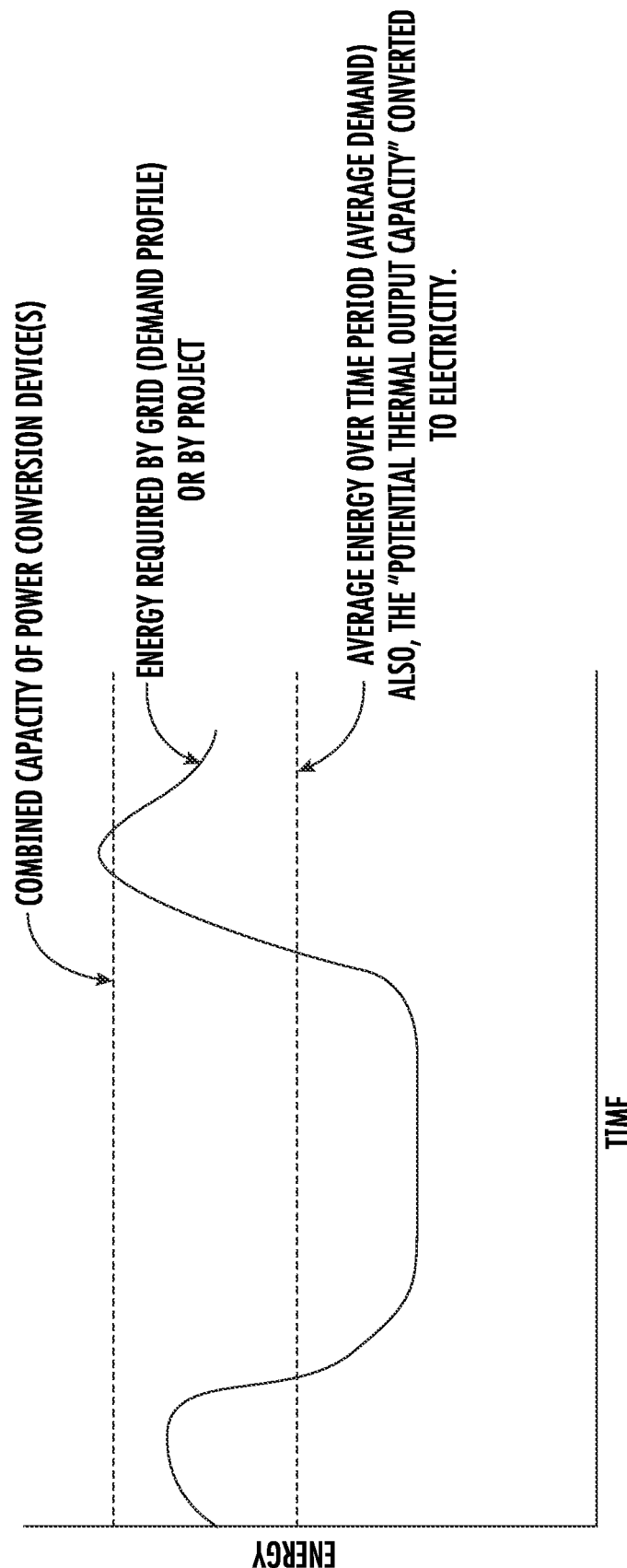
FIG. 10 is a schematic illustration of the combined power output capacity of a network of power generators.

FIG. 10 illustrates the combined power output capacity of a network of power generators which is necessarily higher than the potential thermal output capacity of the geothermal loop network. The power generation capacity is designed to meet the peak output of the geothermal network when dispatching, which may be set to meet the peak demand from the end-user. This figure illustrates that while the subsurface system has a high geothermal capacity factor, over 80% and typically over 90%, (where the denominator is the potential thermal output capacity), the surface power conversion modules have a relatively lower capacity factor to enable dispatching.

Figure 11:
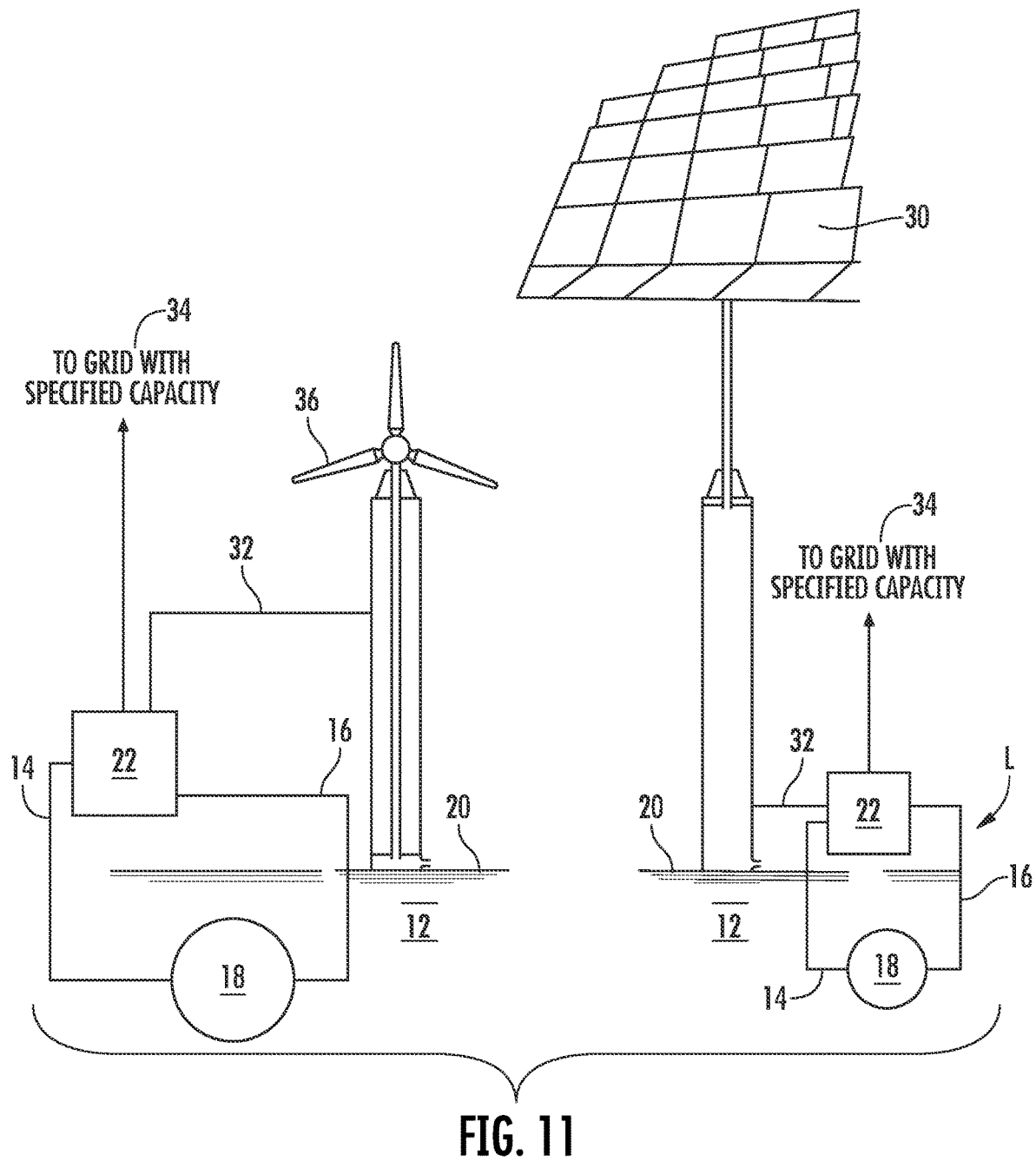
FIG. 11 is a schematic illustration to mitigate electrical grid saturation with intermittent sources of power.

FIG. 11 illustrates an embodiment of the invention designed to mitigate electrical grid saturation with intermittent sources of power. In the example, a solar recovery arrangement 30 is operatively connected to a loop, L, (loop arrangement or solution) and more specifically to the array 30 at 32. The power generation device 22 is in electrical communication with the grid (not shown) with a specific capacity. This is generally denoted by reference numeral 34.

For the following example, loop arrangement or loop solution is intended to embrace the arrangement discussed herein previously, namely the wells, 14, 16 and interconnection 18 in a thermal bearing geologic formation which may include the power generation device 22.

Solar has a leading place in today's shift to newer cleaner forms of power. Success can, however, bring its own complications. Many electrical grids are now saturated with wind and solar, to the point that it is getting difficult to absorb more intermittent sources of power. Scalable green dispatchable power is required in this scenario. The technology herein can complement new or even existing solar plants.

A typical 10 MW loop, L, unit combines a 5 MW subsurface baseload solution with an ORC and surface facilities scaled to 10 MW. This is to facilitate the inherent dispatchability of the energy produced by the loop, L. This may then be further scaled by the simple addition of more loop arrangements, L. By way of example, a 200 MW loop, L, arrangement has the following operational data.

Example—Grid Saturation Mitigation

|  | Peak Capacity (MW) | Average Utilization (MW) | Load Factor (%) |
|---|---|---|---|
| LOOP ARRANGEMENT |  |  |  |
| Solar Capacity | 200 | 40 | 20% |
| Loop Capacity | 200 | 100 | 50% |
| Transmission Capacity | 200 | 140 | 70% |
| SOLAR ONLY |  |  |  |
| Solar Capacity | 700 | 140 | 20% |
| Loop Capacity | 0 | 0 | N/A |
| Transmission Capacity | 700 | 140 | 20% |
| SOLAR + BATTERY |  |  |  |
| Solar Capacity | 700 | 140 | 20% |
| Battery Capacity (8 h) | 200 | N/A | N/A |
| Transmission Capacity | 200 | 140 | 70% |

Solar Only Solution

For a 200 MW solar farm, because of its intermittent nature, would produce on average only 40 MW. In the event that it is desired to increase the average power production 3.5 times or an additional 100 MW on average, one would have to add an additional 500 MW solar farm and an additional 500 MW in transmission capacity for the simple reason that the solar load factor is going to range between 10% and 25%. Unfortunately, not only does this involve increasing the surface footprint 3.5 times, it also requires upgrading the transmission network 3.5 times (or more undesirably, building new transmission lines to a new solar farm). This is further worsened since most of the increased capacity would be produced at times of the day where considerably below average prices would be achievable.

The Loop Solution

In contrast, one could achieve the same results by incorporating a 200 MW loop solution directly under the existing surface footprint of the current or planned solar farm. Advantageously, no new land acquisition would be required. Furthermore, because the loop arrangement would use its inherent dispatchability to produce power around the 20% load factor of the solar farm, there will be no need for any additional transmission capacity—saving both time and money. Finally, while the loop would not have the transmission capacity to produce much during the period of peak solar production around midday, midday production (which is often of little value) could be shifted to attractive monetization because of the pricing premium to be achieved for dispatchable, rather than intermittent or baseload power.

Solar+Battery Solution

Of course, solar could mimic the loop solution by the addition of enough batteries, but at considerable cost. Instead of just adding a 200 MW loop solution, the solar developer would need to add 500 MW of solar capacity, requiring a massively expanded surface footprint and 200 MW of 8-hour battery storage—resulting in inevitable increased costs and delay.

As a variation to the example, FIG. 11 depicts an arrangement using a windmill 36 as the prime mover.

Figure 12:
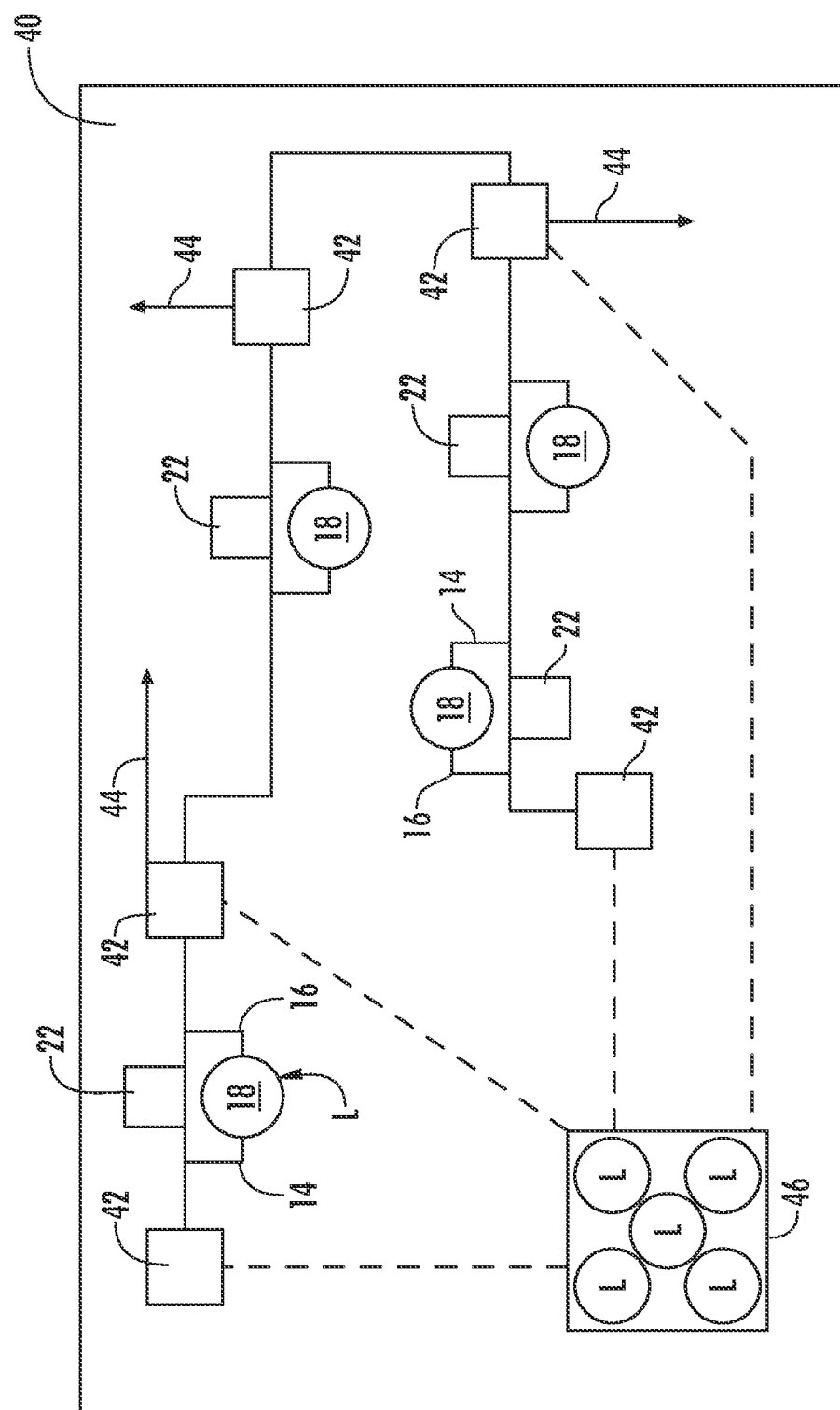
FIG. 12 is a schematic illustration of an alternate embodiment of the present invention.

Referring now to FIG. 12, shown is a further variation to the example. Numeral 40 represents a geographic area on which power distribution centres 42 are arranged to provide electrical delivery via 44 to the power transmission grid (not shown). As is known, the grid has an output capacity. The centres 42 contribute to a power production system over the geographic area 40 with a designed maximum power production quantity and a second effective or "real" power production quantity on the grid.

Clearly, over an expanse of area 40 between centres 42, there are occasionally "brownouts" or other delivery anomalies that occur for a variety of reasons known to those skilled such as is spikes of heavy user demand or redistribution between centres 42.

In order to alleviate inconsistent delivery issues, loop arrangements, L, may be integrated on the circuit of centres 42, such as between adjacent electrically communicating centres 42. As with the previous examples and specification herein, the closed loop configuration can be provided within the underlying geologic formation to produce a predetermined energy output from available potential thermal capacity attributed to the formation.

The working fluid can then be circulated as has been discussed and selectively thermally discharged through said power production arrangement 22 to maintain power production to the capacity throughout said power transmission grid. This accordingly mitigates the anomalies or irregularities noted above.

Depending on the geographic area and other factors, a main distribution hub 46 comprising a plurality of loop arrangements, L, could augment or replace some or all of centres 42 and individually positioned loops, L.

We claim:

1. A method for regulating a thermal output capacity of a well system, the well system including a working fluid capable of thermal charging from a geologic formation, and having an inlet well and an outlet well and disposed within the geologic formation, comprising:
    modulating circulation of said working fluid within said well system to oscillate thermal output from thermally charged working fluid about a characteristic predetermined potential thermal output capacity of said geologic formation, where an averaged oscillated thermal output equals or is less than said characteristic predetermined potential thermal output capacity of said geologic formation and where said characteristic predetermined potential thermal output capacity is determined based on a baseload thermal output of said working fluid flowing at a constant flow rate.

2. The method as set forth in claim 1, wherein said thermal output is inconstant.

3. The method as set forth in claim 1, wherein said thermal output is cycled between a charging operation where said working fluid is thermally charged through conductive heat transfer from said geologic formation and a discharging operation where thermal energy is removed for processing.

4. The method as set forth in claim 3, wherein the processing comprises conversion to at least one of electrical energy, heat energy and combinations thereof.

5. The method as set forth in claim 3, wherein the modulating includes at least one of variation in flow rate of said working fluid, residency time in said system, oscillation duration, thermal charging duration, thermal discharging and combinations thereof.

6. The method as set forth in claim 5, wherein an interaction between said charged working fluid and a power generator includes minimizing said residency time by increasing the flow rate of said charged working fluid.

7. The method as set forth in claim 1, further including a step of generating on demand energy to an end user through interaction between said working fluid and a power generation device.

8. The method as set forth in claim 1, wherein said thermally charged working fluid is circulated above said characteristic predetermined potential thermal output capacity in a discharging cycle to produce on demand power.

9. The method as set forth in claim 1, wherein said geologic formation is selected from a group comprising: a geothermal formation, a low permeability formation, a sedimentary formation, a volcanic formation, a high temperature formation, a variable permeability formation and combinations thereof.

10. The method as set forth in claim 1, wherein cracks, fissures, voids, and/or fractures of said geologic formation are small enough to not allow fluid communication between to spaced-apart inlet and outlet wells.

11. The method as set forth in claim 1, wherein cracks, fissures, voids and or fractures are induced in said geologic formation.

12. The method as set forth in claim 11, further including a step of sealing said cracks, fissures, voids and or fractures is coincident with drilling said inlet and outlet wells.

13. The method as set forth in claim 11, further including a step of sealing said cracks, fissures, voids and or fractures occurring subsequent to drilling said wells.

14. The method as set forth in claim 1, wherein said working fluid includes at least one of a drag reducing additive, a surfactant, a polymeric compound, a suspension, a biological additive, a stabilizing agent, anti-scaling agents, anti-corrosion agents, friction reducers, anti-freezing chemicals, biocides, hydrocarbons, alcohols, refrigerants, phase change materials, organic fluids and combinations thereof.

15. The method as set forth in claim 1, further including a step of storing thermal energy from said charged working fluid in said geologic formation.

16. The method as set forth in claim 1, further including a step of supplementing said working fluid with energy charged working fluid from adjacent wells in said geologic formation.

17. The method as set forth in claim 16, wherein supplementing includes rerouting working fluid from adjacent wells to a well and a power generation device under user demand.

18. The method as set forth in claim 1, wherein the circulation of said working fluid is effected by an induced thermosiphon.

19. The method as set forth in claim 18, wherein hydraulic pressure loss in operation is less than 1.5 times a quantity of a thermosiphon pressure.

20. The method as set forth in claim 18, wherein hydraulic pressure loss in operation is less than 1.0 times a quantity of a thermosiphon pressure.

21. The method as set forth in claim 1, further including a step of amalgamating intermittent renewable energy generating methods with the method of claim 1.

22. The method as set forth in claim 21, wherein said intermittent renewable energy generating methods include wind, solar and electrochemical methods.

23. The method of claim 1, wherein a capacity factor based on an averaged oscillated thermal output divided by said characteristic predetermined potential thermal output capacity of said geologic formation is greater than eighty percent.

24. A method for providing on demand power to an end user with a well system having an inlet well, an outlet well in a thermally productive geologic formation, comprising:
    forming a closed loop with a power generation device operatively connecting said inlet well and said outlet well;
    circulating a working fluid in said closed loop with a predetermined residency time to thermally load the circulating working fluid through conduction from said geologic formation;
    modulating a flow rate of the thermally loaded working fluid within said closed loop for power generation based on user demand;
    interconnecting said inlet well and said outlet well with a plurality of interconnecting sections in a predetermined pattern within said formation; and
    selectively modulating circulation of said working fluid within predetermined sections of said plurality of interconnecting sections of said well system to oscillate a thermal output from the thermally charged working fluid about a characteristic predetermined potential thermal output capacity of said formation, where an averaged oscillated thermal output equals or is less than said characteristic predetermined potential thermal output capacity of said formation and where said characteristic predetermined potential thermal output capacity is determined based on a baseload thermal output of said working fluid flowing at a constant flow rate.

25. The method as set forth in claim 24, further including interconnecting said inlet well and said outlet well with an interconnecting section in fluid communication, at least part of said interconnecting section being disposed for conduction in said thermally productive geologic formation.

26. The method as set forth in claim 25, wherein said interconnecting section is at least one of cased, uncased, lined, chemically treated, chemically sealed, thermally sealed, includes single pipe, coaxial pipe and combinations thereof in a continuous or discontinuous configuration.

27. The method as set forth in claim 24, wherein said geologic formation is selected from a group comprising:
a geothermal formation, a low permeability formation, a sedimentary formation, a volcanic formation, a high temperature formation, a variable permeability formation and combinations thereof.

28. The method as set forth in claim 24, wherein said well system includes pre-existing wells.

29. The method as set forth in claim 28, wherein said geologic formation includes at least one of hot dry impermeable rock, naturally fissured, fractured or cracked rock, synthetically fissured, fractured or cracked rock and combinations thereof.

30. The method as set forth in claim 24, wherein said inlet well and said outlet well are co-located.

31. The method as set forth in claim 24, wherein said interconnecting sections are arranged at least one of:
symmetrically relative to adjacent interconnecting sections;
asymmetrically relative to adjacent interconnecting sections;
in interdigital relation to adjacent interconnecting sections;
in coplanar relation to adjacent interconnecting sections;
in parallel planar relation to adjacent interconnecting sections;
in isolated or grouped networks; and
combinations thereof.

32. The method as set forth in claim 24, further including a step of providing at least one of a plurality of closed loops with the outlet wells of adjacent loops selectively connected to the inlet wells of additional wells, the inlet wells of adjacent wells commonly connected, the outlet wells of adjacent wells commonly connected and combinations thereof.

33. The method as set forth in claim 32, further including a step selectively modulating circulation of said working fluid within predetermined loops of said plurality of closed loops of said well system to oscillate thermal output from thermally charged working fluid about the characteristic predetermined potential thermal output capacity, where the averaged oscillated thermal output substantially equates with said predetermined potential thermal output capacity.

34. The method as set forth in claim 32, wherein the selective connection comprises valved connection with temperature monitoring.

35. The method as set forth in claim 32, wherein the selective connection comprises a daisy chain connection.

36. The method as set forth in claim 35, wherein said daisy chain connection is at least one of continuous, intermittent and combinations thereof.

37. The method as set forth in claim 24, further including a step of amalgamating said method with intermittent renewable energy generating methods.

38. The method as set forth in claim 37, wherein said intermittent renewable energy generating methods include wind, solar and electrochemical methods.

39. The method of claim 24, wherein a capacity factor based on an averaged oscillated thermal output divided by said characteristic predetermined potential thermal output capacity of said formation is greater than eighty percent.

40. A method for providing on demand power to an end user, comprising:
providing a well arrangement comprising an inlet well, an outlet well and an interconnecting section between said inlet well and said outlet well and being disposed within a geologic formation having a characteristic predetermined potential thermal output capacity, said geologic formation having a temperature of at least 90° C.;
connecting said outlet well to a power generation device to recover energy from the well arrangement in a closed loop between the inlet and outlet wells and the power generation device; and
circulating a working fluid within said closed loop at varying flow rates to oscillate thermal output about the characteristic predetermined potential thermal output capacity, to produce on demand power where an average thermal output equals or is less than the predetermined potential thermal output capacity, and where said characteristic predetermined potential thermal output capacity is determined based on a baseload thermal output of said working fluid flowing at a constant flow rate.

41. The method of claim 40, wherein a capacity factor based on an averaged oscillated thermal output divided by said characteristic predetermined potential thermal output capacity of said geologic formation is greater than eighty percent.

* * * * *

UNITED STATES PATENT AND TRADEMARK OFFICE
CERTIFICATE OF CORRECTION

PATENT NO. : 11,460,008 B2
APPLICATION NO. : 17/105568
DATED : October 4, 2022
INVENTOR(S) : Toews et al.

It is certified that error appears in the above-identified patent and that said Letters Patent is hereby corrected as shown below:

In the Claims

Column 15, Line 63, Claim 11, delete "and or" and insert -- or --;

Column 15, Line 66, Claim 12, delete "and or" and insert -- or --;

Column 16, Line 23, Claim 13, delete "and or" and insert -- or --.

Signed and Sealed this
Twenty-eighth Day of February, 2023

*Katherine Kelly Vidal*

Katherine Kelly Vidal
*Director of the United States Patent and Trademark Office*